Patented Jan. 2, 1940

2,185,768

UNITED STATES PATENT OFFICE 2,185,768

PROCESS FOR TREATING HYDROCARBON OIL DISTILLATES FOR THE REMOVAL OF MERCAPTANS

Warren W. Johnstone, Chicago, Ill., assignor to Universal Oil Products Company, Chicago, Ill., a corporation of Delaware No Drawing. Application December 31, 1937, Serial No. 182,793

9 Claims. (Cl. 196—30)

This invention relates particularly to the treatment of the relatively low boiling hydrocarbon oil mixtures of the nature of naphthas and gasolines produced either from the straight run or destructive distillation of petroleum or its fractions.

It is more specifically concerned with a step in the refining treatment of straight run or cracked gasolines which involves their "sweetening" to render them negative in reaction with the so-called doctor solution which is used to indicate the presence of hydrogen sulfide and mercaptans which impart a bad odor to the gasolines.

One of the old methods of sweetening gasolines or naphthas consists in using a solution of an alkali metal plumbite, usually sodium plumbite, produced by dissolving litharge (PbO) in moderately concentrated caustic soda, this solution being agitated either in batch or continuous processes with the sour distillates after which the aqueous layer is settled and limited amounts of sulfur are added to the oil to break down soluble lead mercaptides into insoluble lead sulfide and soluble di-alkyl disulfides which are comparatively odorless. There are several disadvantages to this type of treatment. Apart from the tendency of certain oils to form emulsions with the alkaline reagent under vigorous agitation it is necessary to carefully regulate the amount of sulfur added to the plumbite treated oil to get a "break" within a reasonable time while adding no excess sulfur which would dissolve in the oil and increase its total sulfur content. Another disadvantage is that the alkaline solution reacts to a greater or lesser extent with phenolic compounds which are present in many gasolines particularly cracked gasolines, these phenols acting as natural inhibitors to prevent the deterioration of the gasolines or naphthas on storage in respect to gum content and anti-knock value. A further advantage which is tied in with the fact that the preferred reagents of the present process do not extract phenols and other weakly acidic substances is that there is no later separation of a layer or scum of black material representing compounds that were loosely held by the alkali and which eventually separate to form an intermediate layer which is not distinctly soluble in either an oil or the aqueous layer.

In one specific embodiment the present invention comprises the treatment of sour distillates for the sweetening thereof with aqueous lead acetate solution of litharge followed by removal of the aqueous layer and the use of sulfur to break out the soluble lead mercaptides as lead sulfide.

Since the solutions used for sweetening according to the present invention are not alkaline in the sense that they react with weakly acidic inhibiting compounds such as phenols, there is no increased tendency toward the formation of gums or loss in ant-knock value upon storage in the distillates after the preferred treatment. Obviously the same precautions must be observed in breaking out the lead mercaptides as are commonly observed when sweetening with alkali plumbite solutions. The technique of the process will be essentially the same as that of the older "doctor" or sodium plumbite process in that operations may be conducted in batch agitators or in continuous treating plants consisting of alternate mixing and settling devices which are well-known in refinery practice. The treatments may be applied at any stage in the refining of naphthas or gasolines, that is, before or after other chemical treatments or before or after fractionation or stabilization as commonly practiced.

Further advantages in favor of the present type of treatment over the older plumbite treatments are to be noted. It has already been noted that there is no accumulation of intermediate layers due to the extraction and later separation of weakly acidic compounds to form what is known in practice as "black strap" layer, since the phenols and similar compounds are not extracted by the present type of reagent. It has further been noted that there is a greatly decreased tendency to the formation of emulsions which are frequently troublesome when using the alkali plumbite solutions. Also owing to the relativity of the sweetening reactions there is a greatly decreased tendency for the development of color in gasolines sweetened by the process which is sometimes considerable in the case of the older plumbite treatments.

The novel sweetening reagents of this invention are made by saturating lead acetate solutions of approximately 10–30% concentration with litharge which is the oxide of lead corresponding to the formula PbO. There are a number of basic lead acetates and the formulae of the principal known compounds are given below:

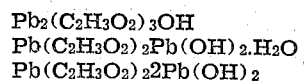

Exact figures are not available on the exact capacity of lead acetate solutions within the concentrations specified for dissolving litharge but best results have been obtained in sweetening with the present process by adding litharge to complete saturation.

The following data is introduced to show the advantages of the present process in sweetening gasolines in comparison with the older sodium plumbite method, basing the comparison upon the induction period in the oxygen bomb and the total gums are determined by the copper dish method, since just sufficient of the reagents were used to produce sweet gasolines in every instance. These data are selected and are not introduced with the intent of correspondingly limiting the scope of the invention. The gasolines treated were produced by cracking heavy distillate petroleum fractions from the Michigan, Pennsylvania, and Texas fields respectively. The sodium plumbite reagent employed in the comparisons was one commonly used in a refinery consisting of a saturated solution of lead oxide in a 20% aqueous sodium hydroxide solution while the lead acetate reagent was made by similarly saturating a 20% aqueous solution of lead acetate.

*Sweetening Data*

|  | Michigan | | Pennsylvania | | Texas | |
|---|---|---|---|---|---|---|
|  | Sodium plumbite | Lead acetate | Sodium plumbite | Lead acetate | Sodium plumbite | Lead acetate |
| Oxygen bomb stability induction period, minutes: | | | | | | |
| Sweetened gasoline | 180 | 325 | 60 | 95 | 130 | 240 |
| Sweetened gasoline +.01% commercial inhibitor | 405 | 585 | 255 | 270 | 275 | 380 |
| Copper dish gums, mgs./100 cc.: | | | | | | |
| Sweetened gasoline | 119 | 135 | 202 | 174 | | |
| Sweetened gasoline +.01% commercial inhibitor | 52 | 26 | 3 | 5 | | |

It is to be noted in every instance that the induction period of the lead acetate sweetened gasolines is higher than the corresponding induction period of those sweetened by sodium plumbite although the difference is not great in the case of the Pennsylvania gasoline which would obviously not contain any great amount of "natural" inhibitors on account of the relative freedom from sulfur, oxygen and nitrogen of charging stocks from the paraffinic Pennsylvania crudes. The sodium plumbite treated gasolines showed a greater inhibitor response as indicated by the increased induction periods after adding commercial inhibitor, although the figure attained was not in any case as large as that resulting in the use of the inhibitor in the lead acetate sweetened stocks. In the case of the Michigan gasoline the response to the use of inhibitor in regard to gum content was considerably greater when the stock was sweetened with the lead acetate reagents.

I claim as my invention:

1. A process for treating hydrocarbon oil distillates for the removal of mercaptans therefrom and for producing other refining effects without removing inhibiting materials, which comprises subjecting said distillate to treatment with an aqueous lead acetate solution of litharge, separating the aqueous and oil layers, adding sulfur to the oil layer in amounts adequate to convert substantially all oil-soluble lead mercaptides into lead sulfide and di-alkyl disulfides, and recovering the treated distillate.

2. A process for treating hydrocarbon oil distillates for the removal of mercaptans therefrom and for producing other refining effects without removing inhibiting materials, which comprises subjecting said distillate to treatment with a saturated solution of litharge in lead acetate, separating the aqueous and oil layers, adding sulfur to the oil layer in amounts adequate to convert substantially all oil-soluble lead mercaptides into lead sulfide and di-alkyl disulfides, and recovering the treated distillate.

3. A process for treating hydrocarbon oil distillates for the removal of mercaptans therefrom and for producing other refining effects without removing inhibiting materials, which comprises subjecting said distillate to treatment with litharge dissolved in an aqueous solution of a basic lead acetate of from 10 to 30% concentration, separating the aqueous and oil layers, adding sulfur to the oil layer in amounts adequate to convert substantially all oil-soluble lead mercaptides into lead sulfide and di-alkyl disulfides, and recovering the treated distillate.

4. A process for treating cracked hydrocarbon oil distillates for the removal of mercaptans therefrom and for producing other refining effects without removing inhibiting materials, which comprises subjecting said distillate to treatment with litharge dissolved in an aqueous solution of lead acetate, separating the aqueous and oil layers, adding sulfur to the oil layer in amounts adequate to convert substantially all oil-soluble lead mercaptides into lead sulfide and di-alkyl disulfides, and recovering the treated distillate.

5. A process for treating cracked hydrocarbon oil distillates for the removal of mercaptans therefrom and for producing other refining effects without removing inhibiting materials, which comprises subjecting said distillate to treatment with a saturated solution of litharge in lead acetate, separating the aqueous and oil layers, adding sulfur to the oil layer in amounts adequate to convert substantially all oil-soluble lead mercaptides into lead sulfide and di-alkyl disulfides, and recovering the treated distillate.

6. A process for treating cracked hydrocarbon oil distillates for the removal of mercaptans therefrom and for producing other refining effects without removing inhibiting materials, which comprises subjecting said distillate to treatment with litharge dissolved to the saturating point in an aqueous solution of a basic lead acetate of from 10 to 30% concentration, separating the aqueous and oil layers, adding sulfur to the oil layer in amounts adequate to convert substantially all oil-soluble lead mercaptides into lead sulfide and di-alkyl disulfides, and recovering the treating distillate.

7. In the sweetening of hydrocarbon distillates, the step which comprises treating the distillate with a lead acetate solution of litharge.

8. In the sweetening of hydrocarbon distillates, the step which comprises treating the distillate with a saturated solution of litharge in lead acetate.

9. In the sweetening of hydrocarbon distillates, the step which comprises treating the distillate with litharge dissolved to the saturation point in an aqueous lead acetate solution of from 10 to 30% concentration.

WARREN W. JOHNSTONE.